W. V. ALDRIDGE.
MARKING ATTACHMENTS FOR LAND ROLLERS.
No. 181,300.                  Patented Aug. 22, 1876.
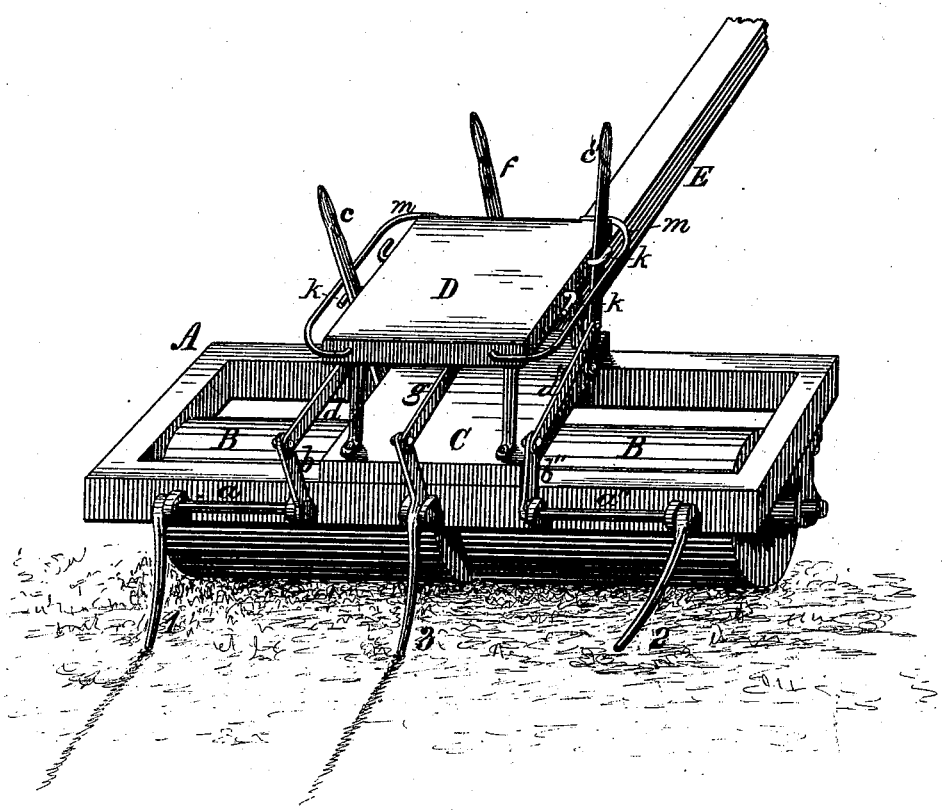
Witnesses                          Inventor,
W. R. Wright.        By   William V. Aldridge,
E. W. Smith.            Thomas G. Orwig,
                                          Attorney.

UNITED STATES PATENT OFFICE.

WILLIAM V. ALDRIDGE, OF LEBANON, IOWA, ASSIGNOR OF ONE-HALF HIS RIGHT TO JAMES W. BROWN, OF SAME PLACE.

IMPROVEMENT IN MARKING ATTACHMENTS FOR LAND-ROLLERS.

Specification forming part of Letters Patent No. 181,300, dated August 22, 1876; application filed May 11, 1876.

*To all whom it may concern:*

Be it known that I, WILLIAM V. ALDRIDGE, of Lebanon, in the county of Van Buren and State of Iowa, have invented a Marking Attachment for Land-Rollers, of which the following is a specification:

The object of my invention is to save time, labor, and expense in preparing ground for corn and other seeds usually planted in rows. It consists in forming, arranging, and combining a marking attachment with a land-roller, as hereinafter fully set forth.

My drawing is a perspective view, illustrating the construction, application, and operation of my invention.

A represents the oblong frame of a land-roller, to which the rollers B B are journaled in any suitable way. C is a platform, rigidly secured on the top and center of the frame A. D is a driver's seat, mounted on top of the platform C. E is the pole to which the horses are attached. $a$ is a rock-shaft, fixed in suitable bearings attached to the rear side of the frame A. It extends from the platform C to near the left end of the frame, where it bends downward and rearward to form a marker, No. 1. $b$ is a crank on the inner end of the shaft $a$. $c$ is a hand-lever, pivoted at its lower end to the platform C. $d$ is a pitman, connecting the crank $b$ on the end of the shaft $a$ with the hand-lever $c$. $a''$ $b''$ $c''$ $d''$ is a corresponding device at the opposite end of the frame A, and forms marker No. 2.

No. 3 is a marker, pivoted in a bearing fixed in the rear and center of the frame A. It is operated by means of a hand-lever, $f$, pivoted to the front and center of the platform C, and connected with the top of the marker by a rod, $g$.

$k$ $k$ are hooks in the end of the seat D, standing in reverse order to each other. The one holds the lever $c$ when the marker is operating, and the other hook holds the lever in position as required to make the marker inoperative.

$m$ $m$ are fenders fixed to the ends of the seat to guard the hand-levers $c$ $c''$.

In the practical operation of my invention a plowed field may be rolled and marked at the same time.

In starting the machine along the left side of a field the marker No. 2 should be made inoperative, as shown in the drawing, by the securing the hand-lever $c'$ in the front hook $k$. The markers Nos. 1 and 3 will form parallel and equidistant lines in the ground pressed and leveled by the rollers B B moving in advance. At the end of the field, when the machine is turned around to return, No. 2 marker must be made operative and No. 1 marker inoperative. The lines shown by the contrast of the rolled ground and the unrolled plowed ground will be sufficient guide to direct the driver in passing back and forth across the field, and there will be no necessity to set stakes or otherwise fix guides.

The hand-levers connected with the markers are all within reach of the driver's seat, so that they can be readily adjusted as required. Complete provision is thus made to simultaneously roll and mark plowed ground, ready for planting, by passing over the field only one time, and without dismounting to adjust the markers or to fix guides.

I am aware that marking devices have been attached to land-rollers; but I claim that my manner of forming and applying markers so that the driver can adjust and control them without dismounting is novel and greatly advantageous.

I claim as my invention—

The rock-shaft $a$, crank $b$, hand-lever $c$, and pitman $d$, forming the independent mechanism of marker No. 1, and the corresponding parts $a''$ $b''$ $c''$ $d''$, forming the independent marker No. 2, and the hand-lever $f$, connecting-rod $g$, and pivoted marker No. 3, all arranged and combined with the land-roller A B, having the central platform C and seat D, substantially as and for the purposes shown and described.

WILLIAM V. ALDRIDGE.

Witnesses:
H. G. PETTIT,
W. H. VINCENT.